US012362467B2

(12) United States Patent
Chase et al.

(10) Patent No.: US 12,362,467 B2
(45) Date of Patent: *Jul. 15, 2025

(54) SMALL CELL INSTALLATION STRUCTURE

(71) Applicant: EasyStreet Systems, Inc., Spokane, WA (US)

(72) Inventors: Peter Joseph Chase, Spokane, WA (US); Kent Alton Harrison, Spokane, WA (US)

(73) Assignee: EasyStreet Systems, Inc., Spokane, WA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/347,719

(22) Filed: Jul. 6, 2023

(65) Prior Publication Data

US 2023/0352822 A1 Nov. 2, 2023

Related U.S. Application Data

(63) Continuation of application No. 17/388,487, filed on Jul. 29, 2021, now Pat. No. 11,742,568, which is a continuation of application No. 16/750,804, filed on Jan. 23, 2020, now Pat. No. 11,114,751.

(60) Provisional application No. 62/900,336, filed on Sep. 13, 2019.

(51) Int. Cl.
*H01Q 1/36* (2006.01)
*H01Q 1/24* (2006.01)
*H01Q 1/44* (2006.01)

(52) U.S. Cl.
CPC ............. *H01Q 1/368* (2013.01); *H01Q 1/246* (2013.01); *H01Q 1/44* (2013.01)

(58) Field of Classification Search
CPC .......... H01Q 1/44; H01Q 1/368; H01Q 1/246; H01Q 1/1242
See application file for complete search history.

(56) References Cited

U.S. PATENT DOCUMENTS

| | | | | |
|---|---|---|---|---|
| 8,806,825 B2 * | 8/2014 | Egan | E04F 13/045 52/302.1 |
| 9,790,688 B2 * | 10/2017 | Mustapha | E04D 13/006 |
| 10,056,017 B2 * | 8/2018 | Butler, III | B25J 1/04 |
| 11,114,751 B2 * | 9/2021 | Chase | H01Q 1/1242 |

(Continued)

OTHER PUBLICATIONS

"Notice of Allowance", U.S. Appl. No. 16/750,804, Jun. 30, 2021, 8 pages.

(Continued)

*Primary Examiner* — Lam T Mai
(74) *Attorney, Agent, or Firm* — FIG. 1 Patents

(57) ABSTRACT

In aspects of a small cell installation structure, a support structure provides stability and an attachable framework to mount wireless technology equipment. A formable aesthetic housing is formed around the support structure, and a hardened polymer coating over the formable aesthetic housing is adapted to a shape of the formable aesthetic housing and the support structure. The hardened polymer coating resists environmental conditions that may otherwise interfere with performance of the wireless technology equipment. Additionally, an antenna housing module encloses antennas of the wireless technology equipment, is integrated with the support structure, and is designed to pass millimeter wave (mmW) spectrum wireless signals.

20 Claims, 8 Drawing Sheets

(56) References Cited

U.S. PATENT DOCUMENTS

| | | | | |
|---|---|---|---|---|
| 11,742,568 | B2 * | 8/2023 | Chase | H01Q 1/44 343/721 |
| 2016/0190707 | A1 | 6/2016 | Park et al. | |
| 2017/0279187 | A1 | 9/2017 | Lockwood et al. | |
| 2017/0355391 | A1 | 12/2017 | Wittkowski et al. | |
| 2018/0187289 | A1 | 7/2018 | Li et al. | |
| 2018/0219278 | A1 | 8/2018 | Wigdahl et al. | |
| 2018/0351245 | A1 | 12/2018 | Constance et al. | |
| 2020/0185823 | A1 | 6/2020 | Constance et al. | |
| 2020/0263951 | A1 | 8/2020 | Bergman | |
| 2020/0359462 | A1 | 11/2020 | Zimmerman, III et al. | |
| 2020/0373682 | A1 | 11/2020 | Root et al. | |
| 2020/0374980 | A1 | 11/2020 | Zimmerman, III et al. | |
| 2021/0175542 | A1 | 6/2021 | Badding et al. | |
| 2022/0021107 | A1 | 1/2022 | Chase et al. | |

OTHER PUBLICATIONS

U.S. Appl. No. 17/388,487 , "Non-Final Office Action", U.S. Appl. No. 17/388,487, Aug. 16, 2022, 11 pages.

U.S. Appl. No. 17/388,487 , "Notice of Allowance", U.S. Appl. No. 17/388,487, May 3, 2023, 8 pages.

* cited by examiner

SMALL CELL INSTALLATION STRUCTURE

RELATED APPLICATIONS

This application is a continuation of and claims priority to U.S. patent application Ser. No. 17/388,487 filed Jul. 29, 2021 entitled "Small Cell Installation Structure," which is a continuation of and claims priority to U.S. patent application Ser. No. 16/750,804 filed Jan. 23, 2020, now U.S. Pat. No. 11,114,751, issued on Sep. 7, 2021 entitled "Small Cell Installation Structure," which claims priority to U.S. Provisional patent application Ser. No. 62/900,336 filed Sep. 13, 2019 entitled "Small Cell Installation Structure," the disclosures of which are incorporated by reference herein in their entireties.

BACKGROUND

With the advent of 5G wireless technology, millions of small cells will be needed to provide support for the growth of wireless communications and the Internet of Things (IOT) devices. The Federal Communications Commission (FCC) is mandating that cities support this endeavor by fast tracking deployment of small cells to support the use of fifth generation (5G) cellular network technology. This 5G wireless technology is being implemented to provide faster data downloads and more network reliability, and will support connected autonomous vehicles, smart communities, IoT devices, immersive interactions in industry, education, and entertainment, and many other features. Notably, this 5G wireless technology is delivered via fiber optics to service sites and then over wireless frequencies, including millimeter wave (mmW) spectrum. A cellular network can have a service area divided into geographic areas as service sites, commonly referred to as "small cells" each with transceivers and multiple antennas for wireless communication using a variety of wireless frequencies, including millimeter wave (mmW) used by all commercial and private wireless network providers.

Millions of these small cell service sites are needed to implement and support 5G wireless, such as in shopping centers, on college campuses, and generally throughout downtown regions of cities and in metropolitan areas. As defined by the Small Cell Forum (SCF), a small cell is a radio access point with low radio frequency (RF) power output, footprint, and range. It is operator-controlled, and can be deployed indoors or outdoors, and in a licensed, shared, or unlicensed spectrum. Small cells complement the macro network to improve coverage, add targeted capacity, and support new services and user experiences. There are various types of small cells, with varying range, power level, and form factor, according to use cases. The smallest units are for indoor residential use, while the larger units are for urban or rural outdoor environments.

As new commercial 5G networks are deployed around the World, the need for small cell sites in urban and metropolitan areas will far outpace the number of traditional cellular macro-sites, and expectations are that four to five million (or more) small cell sites are needed just in the United States. However, conventional construction materials, procedures, and installation equipment typically used for macro-sites will impede 5G network expansion through high costs and delayed implementation. Further, many municipalities are requiring that small cell sites seamlessly blend into the existing landscape in which they are installed. Despite FCC mandates toward streamlining the local, county, and state building codes for small cell deployment, these government entities and, more importantly, the residents, must see the installation and operation of these sites as being either an enhancement or invisible to their environment. Notably, conventional steel pole and tower solutions are expensive to install, and even current small cell designs implemented with steel poles do not materially reduce the cost of site construction, do not speed the requirements for network deployment, and are quite limited in aesthetic design choices.

BRIEF DESCRIPTION OF THE DRAWINGS

Implementations of a small cell installation structure are described with reference to the following Figures. The same numbers may be used throughout to reference similar features and components that are shown in the Figures.

DETAILED DESCRIPTION

Figure 1:
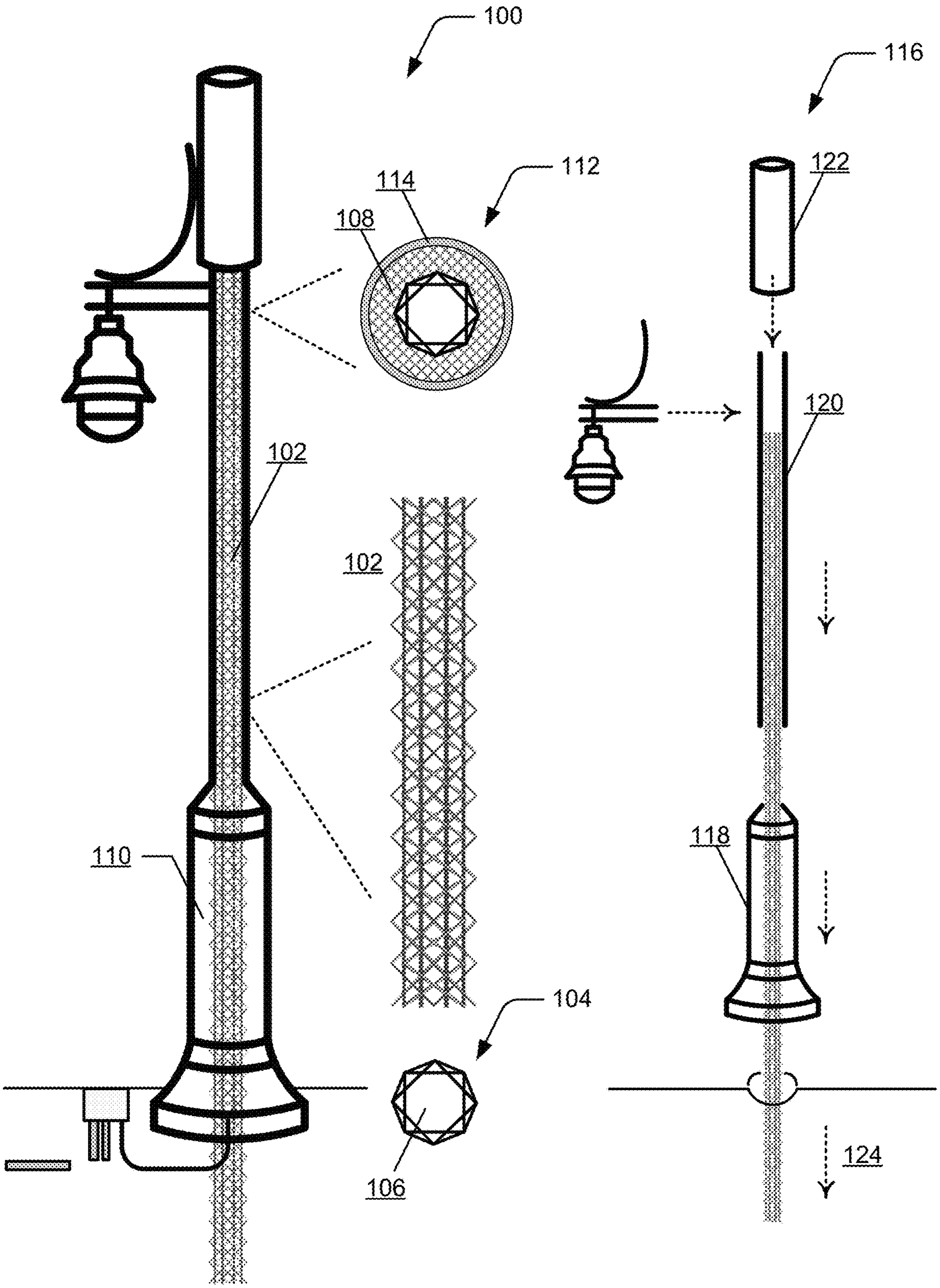
FIG. 1 illustrates features of an example small cell installation structure in accordance with aspects of one or more implementations.

Implementations of various small cell installation structures are described, and provide a modular and easily deployable solution for lightweight and aesthetically conforming, yet strong and durable, small cell installation structures implemented to support 4G LTE advanced technology and next evolution 5G network service sites as small cell installations. The aesthetics associated with deploying a 5G network are a particularly sensitive consideration for implementation in historic districts, on college campuses, and in metropolitan areas, while still providing an exceptional 5G wireless signal to meet the demands for increased bandwidth and constant connectivity. Additionally, the cost per small cell installation structure, capital expenditure, deployment, and operations is significantly reduced, while maintaining or improving wireless communication reliability for the successful deployment of 5G networks.

With the use of innovative, lightweight yet rugged construction materials that pass radio frequency (RF) signals, the small cell installation structures described herein can be implemented as site design packages that provide at least a two-times capital expenditure reduction for small cell poles and equipment enclosures over conventional materials and techniques, as specified in 5G standards set by some governing municipalities. A small cell installation structure also provides at least a two-times material cost reduction, as well as a significant weight reduction, reduction in deployment time and personnel needed for installation, and provides enhanced security via robust lockable access panels, anti-corrosion materials, and anti-vandalism resilient coatings. Notably, a small cell installation structure is an easy, light-weight installation, such as with a foam foundation, and easily handled by a two-person crew, given that a six inch (6") diameter, twenty foot (20') pole would only weigh approximately ninety pounds (90 lbs). A small cell installation structure can be fully kitted with footings, pre-assembled electronics and equipment, and power and grounding ports for rapid deployment and installation.

In addition to these many advantages and metrics, a small cell installation structure can be implemented using a structural support with any type of a formable foam material or any of the various types of polyurethane products coated with a polyuria that can be shaped and adapted as a formable aesthetic housing in any type of a small cell site design package to blend in with a surrounding environment. For example, a small cell installation structure can be designed to blend in with a metropolitan or urban setting, and to meet military camouflage requirements for being unobtrusively integrated into a commercial and/or military environment. An aesthetic implementation may include minimizing the side view of a small cell installation structure, such as by using an oval or even thinner blade-view configuration, where from the viewing angle of a person walking or driving down a street, the person would only see a very thin profile of consecutive small cell installation structures, if the person even notices them at all. This may greatly enhance the notion of unobtrusively integrating small cell installation structures into areas and environments that are particularly sensitive to adding additional network service sites.

Generally, a small cell installation structure can be implemented for predominantly a 5G small cell with pole heights between four and fifty feet tall, although shorter and/or taller pole heights may be accomplished as well. As a lightweight tower structure, a small cell installation structure can be installed by a small crew, having much lower installation costs than conventional steel pole solutions, and providing ease of installation and speed of network deployment. Additionally, these small cell installation structures for private or public 5G small cell sites can be designed to incorporate existing 4G wireless technology equipment, as well as Wi-Fi and IoT systems equipment to achieve desired functions and coverage. Notably, 5G deployment will use a multitude of technologies, including traditional macro cells, Wi-Fi networks, and 4G frequencies, although true 5G in high data use areas such as cities will rely on small cells with mmWave frequencies (between 24 GHz and 100 GHz). Further, the small cell installation structures described herein can be implemented to accommodate a variety of equipment with associated mechanical, electrical, thermal, environmental, and RF operational challenges.

Features and concepts of a small cell installation structure can be implemented in any number of different devices, systems, environments, and/or configurations, such as described in the context of the following examples, systems, and methods.

FIG. 1 illustrates features of an example of a small cell installation structure 100 in accordance with aspects of the techniques described herein. In this example, the small cell installation structure 100 appears as a decorative lamp post, such as may be installed in a park, on a college campus, or in urban and metropolitan areas of a city. In other implementations, a small cell installation structure can be designed as (or part of) a communications tower structure, any type of lamp post, street light, street sign, rooftop site, building cornice, building column, utility pole shrouds, sidewalk container, or any other structure designed to house and/or conceal wireless technology equipment.

In this example, the small cell installation structure 100 has a carbon fiber skeleton 102 to provide stability and function as an attachable framework to mount wireless technology equipment within the carbon fiber skeleton. As shown in a cross-section view 104, the carbon fiber skeleton generally has a void 106 through which cables can be routed and/or equipment installed. Additional views and details of the carbon fiber skeleton are shown and described with reference to FIG. 2. The small cell installation structure can be implemented with a formable foam material 108 configured as an adaptable and formable aesthetic housing 110 around and/or integrated with the carbon fiber skeleton.

As shown in a cross-section view 112, a hardened polymer coating 114 over the formable foam material 108 adapts to a shape of the formable aesthetic housing. The hardened polymer coating is implemented to resist environmental conditions that may otherwise hamper performance of the wireless technology equipment. Notably, the hardened polymer coating is generally water resistant and designed to withstand corrosion, as well as prevent water, dirt, animals, insects, rodents, and any other external environmental matter from entering into the internal spaces of the small cell installation structure. Additional details of the formable foam material 108 are also shown and described with reference to FIG. 2.

In implementations, a small cell installation structure can be implemented as a modular structure 116 with interchangeable components that are reconfigurable and interchangeable to accommodate current and future wireless technology equipment and antennas. In this example, the small cell installation structure 100 includes the carbon fiber skeleton 102 over which a structure base 118 can be installed. In implementations, the structure base 118 may simply slide over the carbon fiber skeleton for installation, such as after the carbon fiber skeleton has been anchored in place or alternatively, as a pre-assembled system for deployment. The structure base 118 can be formed as an interchangeable component of the small cell installation structure 100 using aluminum, fiberglass, or any other type of material, such as a formable foam material with the hardened polymer coating over an internal support structure to maintain the shape of the formable aesthetic housing.

Generally, the structure base 118 can be designed in any configuration, such as the lamp post base in this example, or in any other shape (e.g., round, oval, square, rectangular, multi-sided, etc.) of any various heights, widths, etc. For example, the structure base may be shaped and designed to provide easier pedestrian and/or wheelchair sidewalk access rather than a typical square box enclosure design. In installations, the structure base 118 is an equipment cabinet to enclose at least part of the wireless technology equipment, and can be designed with access panels and/or doors to facilitate access to the interior of the structure base. The structure base of the small cell installation structure can accommodate the needs for integrated RF, power, thermal, and fiber backhaul termination and operation to facilitate a 5G network service site.

In this example, the small cell installation structure 100 also includes a pole module 120 that is installable over the carbon fiber skeleton and can be formed from the formable foam material, such as any type of polyurethane product with the hardened polymer coating, as part of the formable aesthetic housing. In implementations, the pole module 120 may simply slide over the carbon fiber skeleton 102 for installation, such as described above with reference to the structure base. Similar to the structure base 118, the pole module 120 can be designed in any configuration or in any shape (e.g., round, oval, square, rectangular, multi-sided, etc.) of any various heights, widths, etc. With use of the formable and adaptable formable foam material and hardened polymer coating used to form the modular components around and/or integrated with the skeleton support structure, the small cell installation structure 100 can be made to aesthetically conform in any environment, or appear as any type of structure, such as the decorative lamp post in this example, or as a tree, a wooden post, a sidewalk container, etc. with the integrated skeleton framework for structural support.

Notably, any modular component of the small cell installation structure 100 can be replaced with one or more alternate modular components for various configurations of any type of small cell installation structure. For example, a municipality may choose to install several small cell installation structures as the decorative lamp post shown in FIG. 1 throughout a city park, and at a later date, simply replace any one or all of the structure base 118, pole module 120, and/or antenna housing module 122 of a decorative lamp post, changing it to appear as a tree camouflaged in the park environment. This may be accomplished without having to remove and replace the already installed internal carbon fiber structure and/or most of the wireless technology equipment at the small cell site. As an additional advantage, a modular component of a small cell installation structure 100 that has become damaged, such as when run into by a vehicle, can be simply removed and replaced with a comparable modular component, again without having to remove and replace the already installed internal carbon fiber structure and/or most of the wireless technology equipment at the small cell site.

The small cell installation structure 100 also includes the antenna housing module 122 (also referred to as a "cantenna") designed to enclose one or more antennas, as well as any of the wireless technology equipment that is mounted near the top of the small cell installation structure. The antenna housing module 122 can be interchangeable to house and install different antenna systems from different manufacturers and network providers, such as further shown and described with reference to FIGS. 3-5. The antenna housing module 122 can also be formed using the formable foam material with a hardened polymer coating, such as formed using any one of a variety of polyurethane products coated with a polyuria protective coating. The antenna housing module 122 can be integrated with a cable management structure, with the carbon fiber skeleton, and/or integrated with any other type of structural components that provide structural support of the antenna housing module. As noted above, this is a very strong and durable housing that protects the equipment from environmental conditions, yet can also pass millimeter wave (mmW) frequencies (between 24 GHz and 100 GHz), as well as radio frequency (RF) wireless signals up to and including 6 GHz signals.

The antenna housing module 122 can also be designed to facilitate antenna cable management, given that early antenna designs are based on 4G LTE advanced technology, and the antennas will likely support wireless spectrum frequencies from 600 MHz through 6 GHz. This would involve up to sixteen (16) ports or more on the antenna base to support the coaxial connections between the radios and the antennas. Notably, connecting the multiple coaxial cables to the antenna base will likely require a cable management area between the top of the pole module 120 and the antenna housing module 122. In implementations, the cable management area can be incorporated so that the one or more antennas can be mounted directly without the need of additional peripheral hardware. For example, a cable management structure can be integrated with the antenna housing module 122, not only for the purpose of cable management, but also to provide structural integrity for the antenna housing module.

In configurations of the small cell installation structure 100, the antenna housing module 122 attaches to the top of the carbon fiber skeleton 102 and/or to the top of the pole module 120, and the carbon fiber skeleton may extend into the antenna housing to provide structural support, yet does not block or interfere with the wireless signal communications. Further, from an aesthetic consideration, most cities and their citizens do not want to see all of the large cantennas (antenna housings) at the tops of poles throughout their urban and metropolitan areas. By utilizing the formable and adaptable formable foam material, such as any one of a variety of polyurethane products coated with a polyuria protective coating, antenna housing modules of the small cell installation structure 100 can be designed smaller and in different shapes and sizes to accommodate different antenna configurations to reduce the size of cantennas and meet the needs of municipality aesthetic requirements.

In implementations, the carbon fiber skeleton 102 is a structure that may be installed directly into the ground or sub-terrain as shown at 124. The lightweight support structure is easily installed at a depth that enhances the stability of the small cell installation structure 100, some of which is provided by the aesthetic housing 110 that is formed from the formable foam material with the hardened polymer coating. It should be considered that alternate structure base configurations without the carbon fiber structure extending beyond the lower surface of the structure base can also be utilized for small cell installation structure deployment, such as if the support structure is anchored at ground level. In alternate implementations (e.g., alternative to the structure base and/or pole module being designed to simply slide over the carbon fiber skeleton), the formable foam material may be formed to envelop and adhere to the carbon fiber skeleton, forming an integrated structural housing of the small cell installation structure. Further, different forms of structural support may be integrated with the formable foam material of the housing, such as rebar or other composite materials installed through or formed with the formable foam material.

Although the small cell installation structure 100 is shown and described herein as being implemented with the carbon fiber skeleton 102 and the formable foam material to form an adaptable housing, the skeleton structure may be implemented with any other type of material or composite that provides structural stability and/or functions as an attachable framework to mount the wireless technology equipment. Additionally, the adaptable housing may be implemented with any other type of material or composite that provides an aesthetically adaptable housing that protects the wireless technology equipment from the environmental conditions, to include strong winds, heat exposure, ice loading, seismic loading, and other forces that may lend to material degradation.

Skeleton Structure

In aspects of the described small cell installation structure 100, the carbon fiber skeleton 102 can be implemented using any type of carbon fiber lattice or other material to provide the stability and/or an attachable framework structure of a small cell installation structure. The carbon fiber skeleton structure offers a lightweight and efficient alternative to traditional wood, steel, aluminum, and other composite structures, although any of these or similar materials by still be utilized. The carbon fiber skeleton 102 is a composite structure with the performance and weight advantages of expensive aerospace materials, yet is less expensive than comparable steel and fiberglass structures. The carbon fiber skeleton structure provides a composite solution for 4G cell tower and implementation of 5G small cell sites utilizing a geometric design that increases structural strength and stiffness, reduces the weight, and also decreases implementation costs. At least some of the overall cost savings are achieved through a 50% reduction of using expensive composite material compared to traditional solid-walled tubing.

The carbon fiber skeleton 102 is a composite material that can be utilized and integrated to develop a small cell installation structure 100 as described herein, which is cheaper, stronger, and lighter than commercial steel counterparts, and the structures can be manufactured in virtually any diameter and length. Due to its lightweight but strong nature, the carbon fiber skeleton structure can be set-up and installed by a small team of installers using a simple light weight vehicle and common construction tools and materials which are also readily available to rural and urban communities. This makes the carbon fiber skeleton structure an ideal solution to expand broadband networks to rural and hard to reach urban areas, particularly when covered with an aesthetically conforming housing as formed from the formable foam material and/or any other type of a polyurethane product having a hardened polymer coating as the formable aesthetic housing.

Notably, the carbon fiber skeleton structure can be twelve times (12×) stronger than steel, yet weighs only one-twelfth ($1/12^{th}$) the weight of steel. A composite carbon fiber skeleton structure of equivalent strength weighs only one-twelfth ($1/12^{th}$) the weight of a steel structure, where a 100 lb. (45.4 kg) steel pole could be replaced with a 9 lb. (4.1 kg) composite carbon fiber skeleton structure. In implementations, the carbon fiber skeleton structure incorporates stable geometric forms with members that spiral in a piecewise linear fashion in opposing directions around a central cavity. The helical and longitudinal members are repeatedly interwoven, yielding a highly redundant and stable configuration. The geometry of the carbon fiber skeleton structure is generally symmetric and the redundant nature of the skeleton structure provides a strong and damage tolerant design. Further, the carbon fiber skeleton structure achieves an incredibly high strength-to-weight ratio with the geometry that uses longitudinal and helically wound members.

The carbon fiber skeleton structure can be implemented in many different geometric configurations. Naturally, any fiber and resin combination can be used to fabricate the skeleton lattice structure, although the web-like geometry lends itself to high performance, fiber-reinforced polymer composites (e.g., carbon, fiberglass, aramid, or basalt fibers with an epoxy, vinyl ester, or polyester resins, etc.). For structural applications, such as implemented in a small cell installation structure as described herein, the composite skeleton grid structure provides a substantial improvement in structural performance over conventional composite configurations. Similar features and implementation aspects are described in U.S. Pat. No. 10,180,000 to IsoTruss Industries LLC, the disclosure of which is incorporated by reference herein in its entirety.

Polymer Coated, Formable Foam Material

In aspects of the described small cell installation structure 100, the formable foam material with the hardened polymer coating used to form the adaptable and formable aesthetic housing 110 can be implemented using an type of formable, polymer coated foam and/or composite, such as with any type of a polyurethane product having a hardened polyuria or polymer coating. The formable foam material provides a durable alternative to existing small cell tower designs that typically utilize steel, aluminum, or fiberglass. Additionally, as described above, the formable foam material can pass radio frequency waves which allows for a homogeneous solution for the small cell installation structure that includes an equipment structure base, a pole module, and an antenna housing module. Notably, these modular components of the small cell installation structure 100 can be designed to simply slide over the carbon fiber skeleton, such as a skeleton structure as described above. Use of the formable foam material over or integrated with a skeleton structure is supported by material science testing, including tensile modulus, ultimate tensile strength, initial mass, viscoelasticity relaxation, and strain rate. This testing involves various mechanical design analyses for different pole heights, diameters, material thickness, pole deflection under wind load, and base and footing requirements.

In addition, the formable foam material or other type of polyurethane product with a hardened polyuria or polymer coating can be designed for chemical and UV exposure resistance, as well as providing electromagnetic transparency with less than 0.3 dB of loss. As described above, the antenna housing module 122 of the small cell installation structure 100 can be formed using the formable foam material and/or any other type of polyurethane product with the hardened polymer coating, which is a very strong and durable housing that protects the equipment from environmental conditions, yet can also pass millimeter wave (mmW) frequencies (between 24 GHz and 100 GHz), as well as radio frequency (RF) wireless signals up to and including 6 GHz signals. This provides for the design and implementation of the aesthetic and/or camouflaged small cell installation structures with fully integrated radio electronics and antennas.

In implementations, the formable foam material may be any type of a polyurethane foam or a sprayable polyurethane foam over which the hardened polymer coating adapts to a shape of the formable aesthetic housing 110 of the small cell installation structure 100. The hardened polymer coating is applied as a durable polymer (e.g., a polyurea, such as a sprayable material) over the formable foam material, creating a durable, re-usable, waterproof, chemical resistant, and corrosion resistant formable foam material encapsulated with polyurea. Generally, the insulating properties of a formable foam material will not absorb water, chemicals, or moisture if exposed to the elements, and is usable in any weather-related environment. In implementations, the hardened polymer coating can be used to cover the exterior surface, the interior surface, and end surfaces of the formable foam material to prevent exposure to surrounding environment conditions. The polymer coating also prevents animals (e.g., mice, birds, and/or insects) from interacting with the formable foam material, thus preventing animal damage to the small cell installation structure 100 and/or the wireless technology equipment contained therein.

Figure 2:
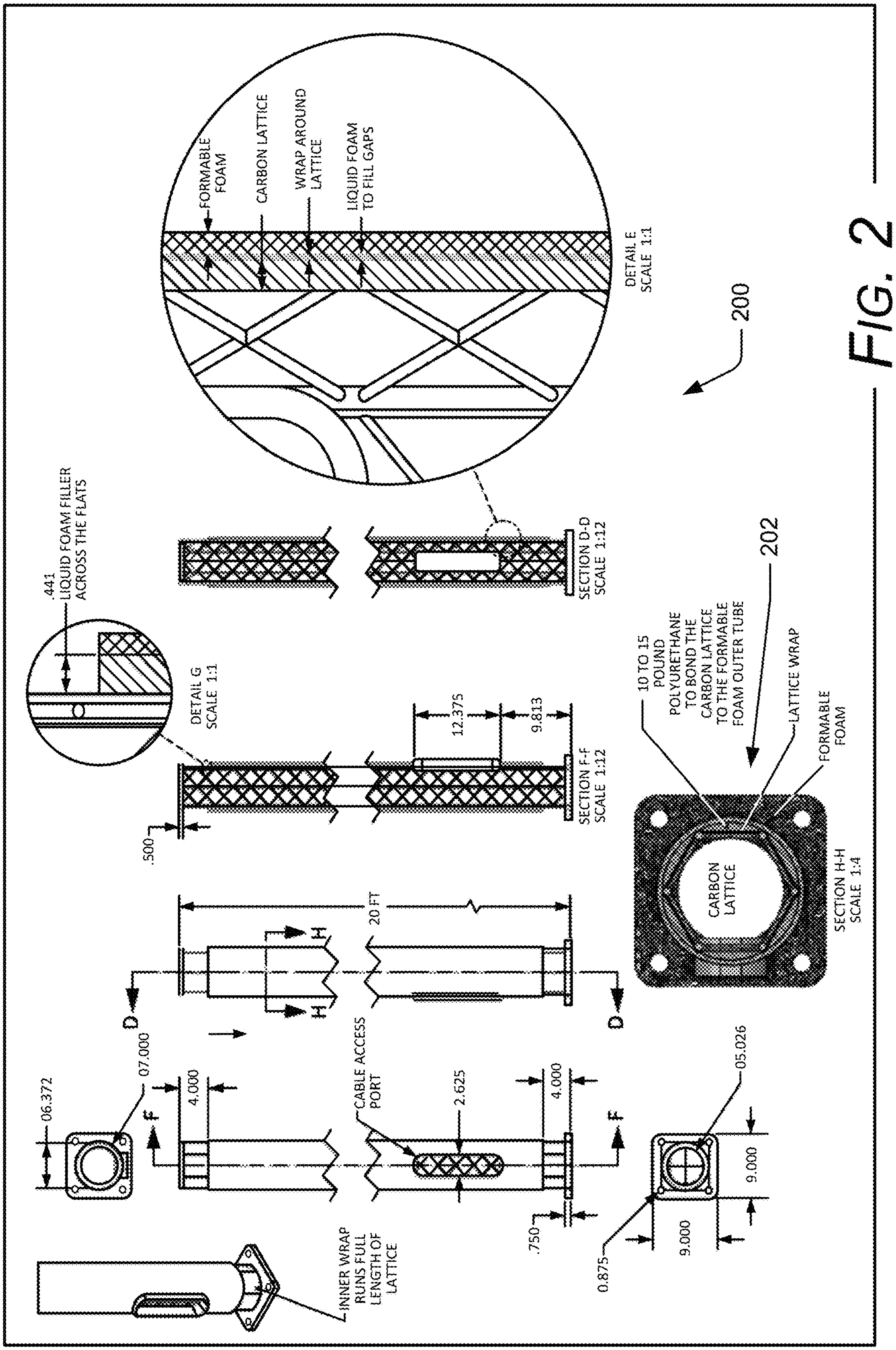
FIG. 2 further illustrates views and details of an example small cell installation structure in accordance with aspects of a lightweight pole system utilizing a carbon fiber skeleton and a formable aesthetic housing.

FIG. 2 further illustrates several different views 200 and details of an example small cell installation structure in accordance with aspects of a lightweight pole system utilizing a carbon fiber skeleton and a formable aesthetic housing, as generally described above with reference to FIG. 1. Notably and as shown at 202, the polyurethane, formable foam material is integrated with and/or installed over the carbon fiber skeleton 102 (also referred to as the "carbon lattice").

Figure 3:
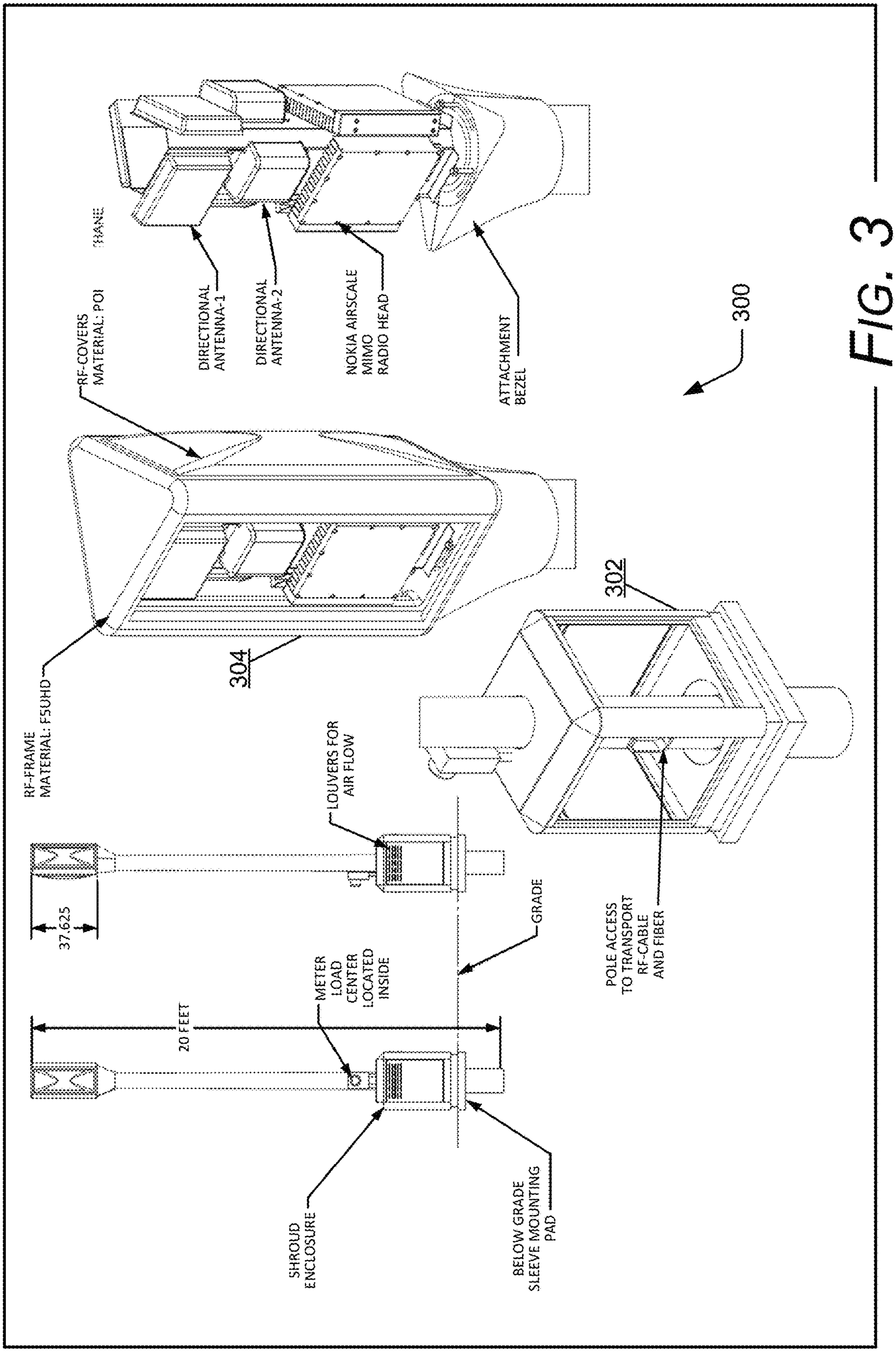
FIG. 3 further illustrates views and details of an example small cell installation structure in accordance with aspects of a structure base and an antenna housing module.

FIG. 3 further illustrates several different views 300 and details of an example small cell installation structure in accordance with aspects of an example structure base 302 and an example antenna housing module 304, as generally described above with reference to the small cell installation structure 100 shown in FIG. 1. For example, the structure base 302 can be formed as an interchangeable component of the small cell installation structure 100 using aluminum, fiberglass, or any other type of material, such as a formable foam material with the hardened polymer coating over an internal support structure to maintain the shape of the structure housing. Further, the antenna housing module 304 can be formed using the formable foam material with a hardened polymer coating, such as formed using any one of a variety of polyurethane products coated with a polyuria protective coating. The antenna housing module 304 can be integrated with a cable management structure, with the carbon fiber skeleton 102, and/or integrated with any other type of structural components that provide structural support of the antenna housing module.

Figure 4:
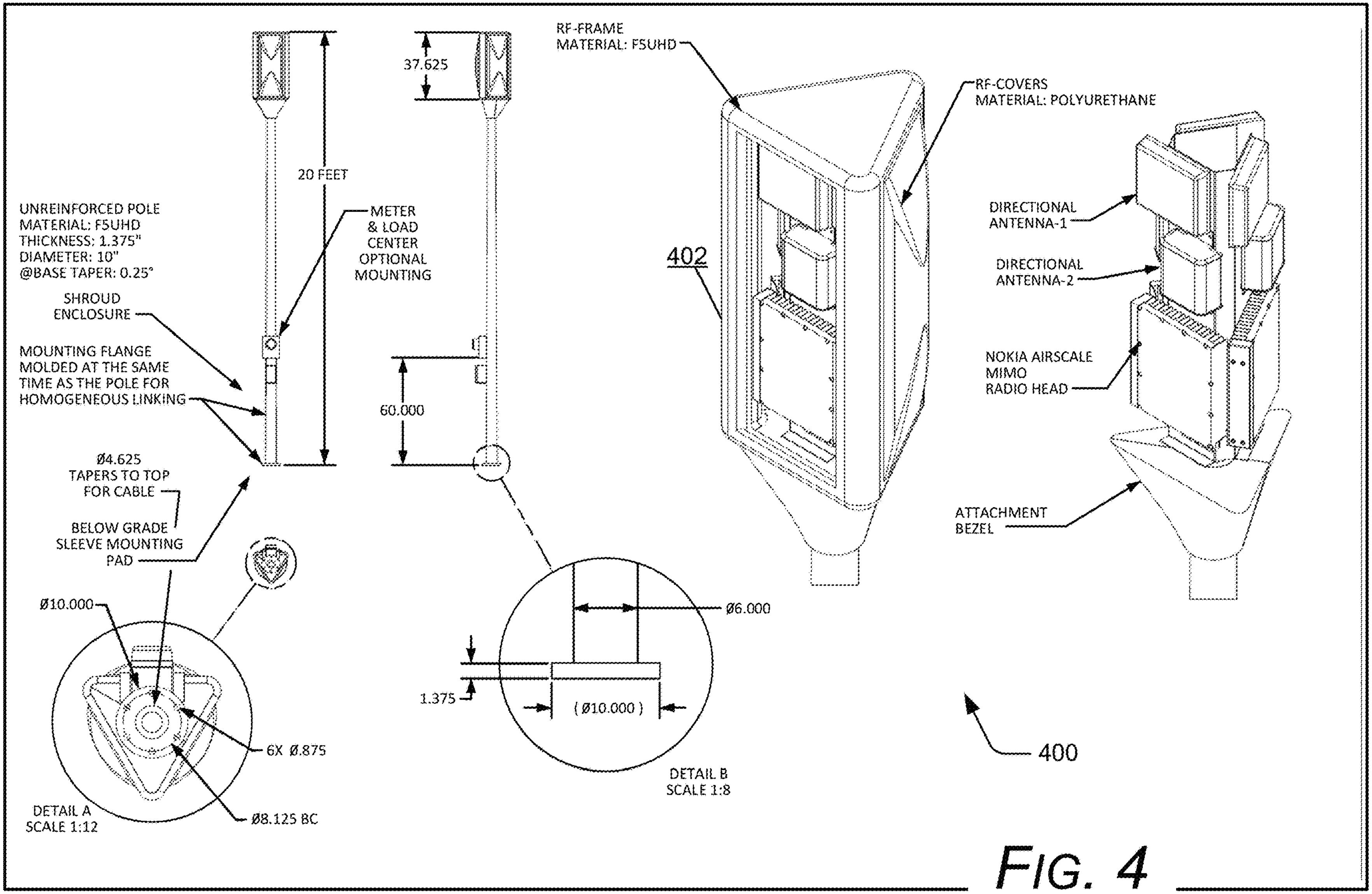
FIG. 4 further illustrates views and details of an example small cell installation structure in accordance with aspects of a structure base and an antenna housing module.

FIG. 4 further illustrates several different views 400 and details of an example small cell installation structure in accordance with aspects of an example antenna housing module 402, as generally described above with reference to the small cell installation structure 100 shown in FIG. 1. For example, the antenna housing module 402 can be formed using the formable foam material with a hardened polymer coating, such as formed using any one of a variety of polyurethane products coated with a polyuria protective coating. The antenna housing module 402 can be integrated with a cable management structure, with the carbon fiber skeleton 102, and/or integrated with any other type of structural components that provide structural support of the antenna housing module.

Figure 5:
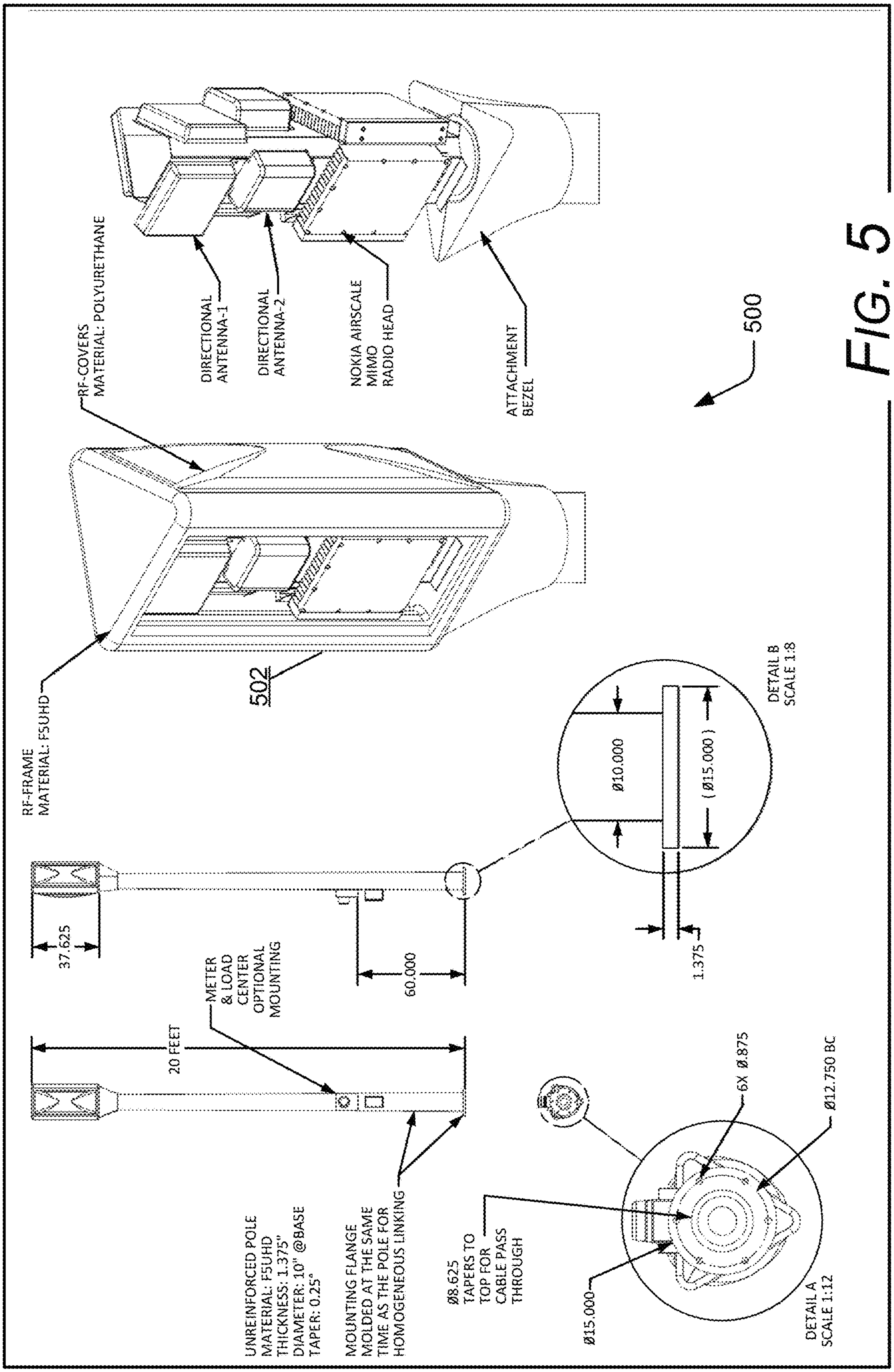
FIG. 5 further illustrates views and details of an example small cell installation structure in accordance with aspects of a structure base and an antenna housing module.

FIG. 5 further illustrates several different views 500 and details of an example small cell installation structure in accordance with aspects of an example antenna housing module 502, as generally described above with reference to the small cell installation structure 100 shown in FIG. 1. For example, the antenna housing module 502 can be formed using the formable foam material with a hardened polymer coating, such as formed using any one of a variety of polyurethane products coated with a polyuria protective coating. The antenna housing module 502 can be integrated with a cable management structure, with the carbon fiber skeleton 102, and/or integrated with any other type of structural components that provide structural support of the antenna housing module.

Figure 6:
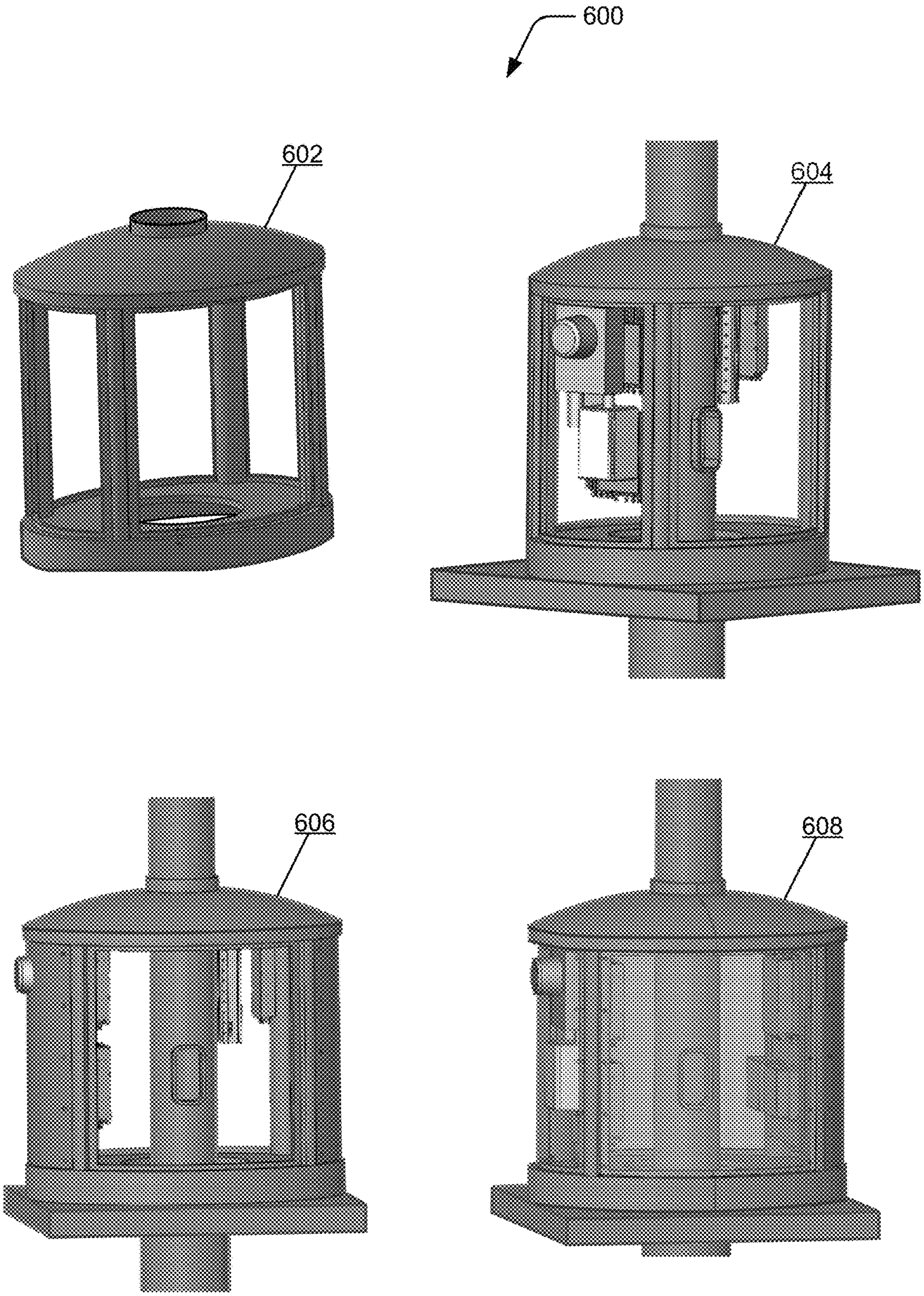
FIG. 6 further illustrates views and details of an example small cell installation structure in accordance with aspects of an oval structure base.

FIG. 6 further illustrates several different views and details of an example oval structure base 600 that can be implemented as part of a small cell installation structure, as generally described above with reference to the small cell installation structure 100 shown in FIG. 1. The different views include an example of a structure base oval shroud 602 of the example oval structure base 600, as well as several views 604, 606, and 608 of the structure base implemented with wireless technology equipment installed therein. The example oval structure base 600 can be formed with the formable foam material with a hardened polymer coating, such as formed using any one of a variety of polyurethane products coated with a polyuria protective coating. Additionally, the example oval structure base 600 can be integrated with the carbon fiber skeleton 102 and/or integrated with any other type of structural components that provide structural support of the structure base for a small cell installation structure.

Figure 7:
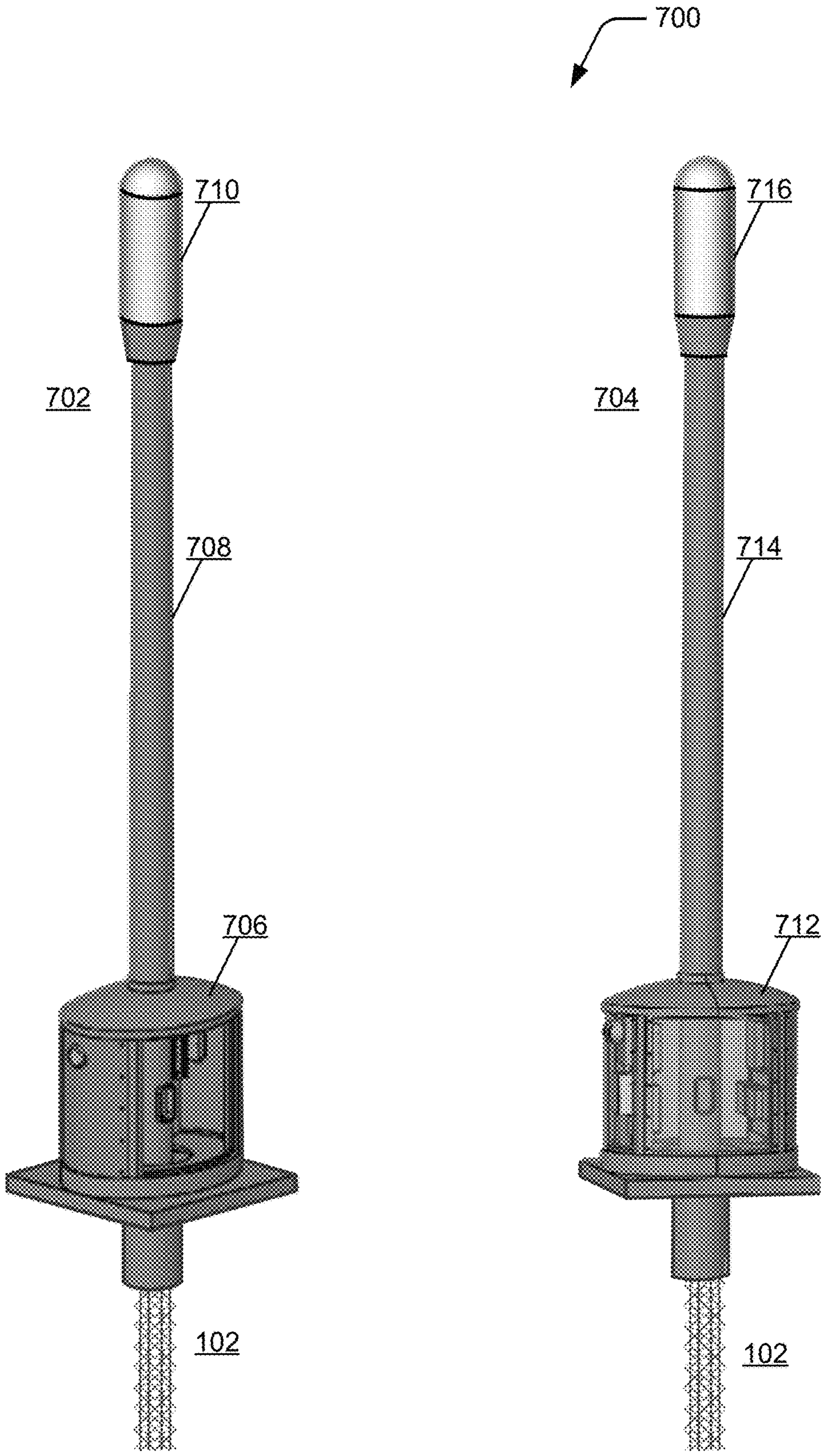
FIG. 7 further illustrates examples of small cell installation structures as omni-poles in accordance with aspects of one or more implementations.

FIG. 7 further illustrates examples 700 of small cell installation structures 702, 704 as omni-poles in accordance with aspects of a small cell installation structure, such as generally described above with reference to the small cell installation structure 100 shown in FIG. 1. For example, the small cell installation structure 702 includes modular components deployed over the carbon fiber skeleton 102, such as a structure base 706, a pole module 708, and an antenna housing 710. In this example, the structure base 706, the pole module 708, and the antenna housing 710 can be integrated with the carbon fiber skeleton 102 for overall structural support of the small cell installation structure. Similarly, the small cell installation structure 704 includes modular components deployed over the carbon fiber skeleton 102, such as a structure base 712, a pole module 714, and an antenna housing 716. In this example, the structure base 712, the pole module 714, and the antenna housing 716 can be integrated with the carbon fiber skeleton 102 for overall structural support of the small cell installation structure.

Figure 8:
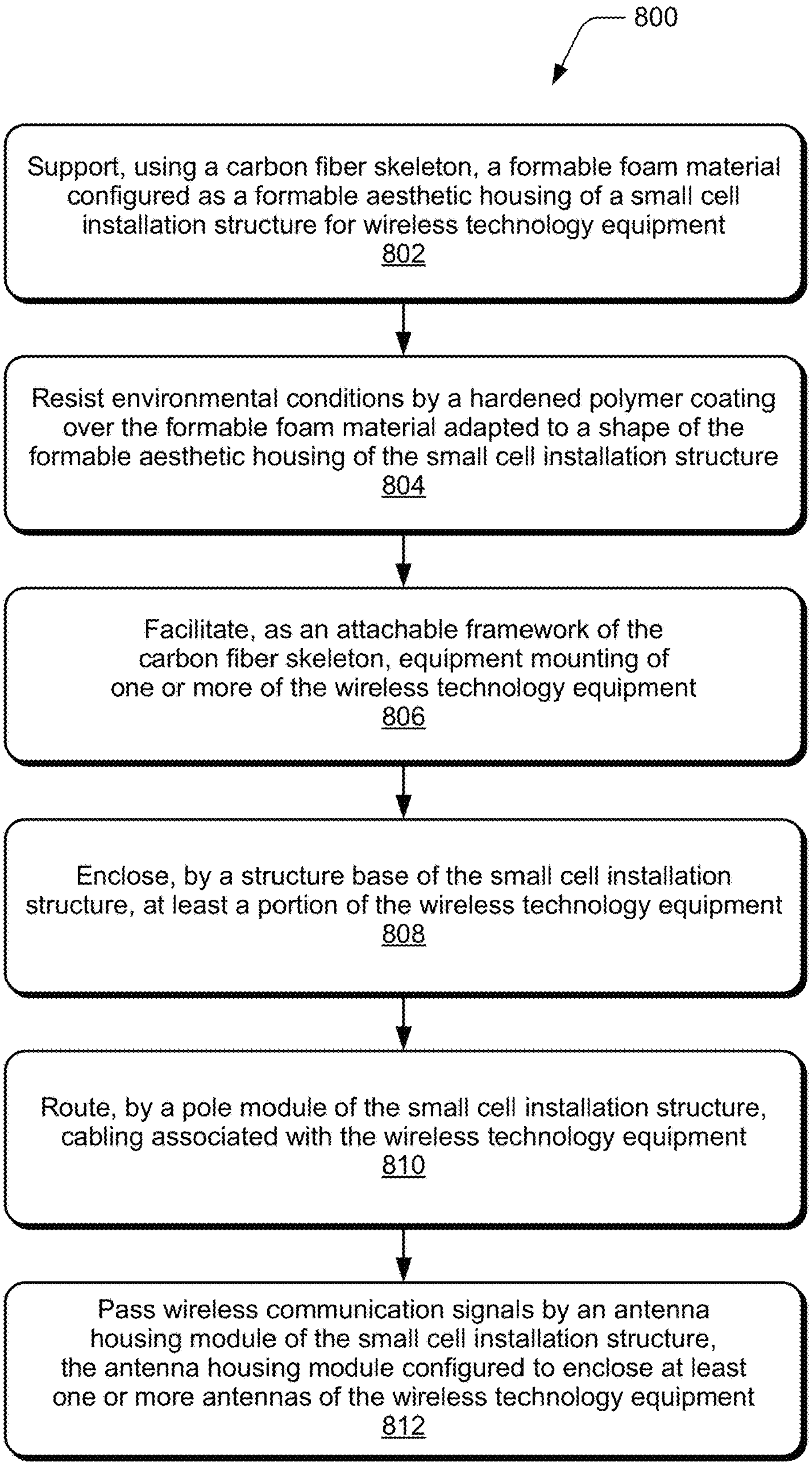
FIG. 8 illustrates an example method of a small cell installation structure in accordance with one or more implementations.

FIG. 8 illustrates an example method 800 for implementations of a small cell installation structure as shown and described with reference to FIGS. 1-7. The order in which the method is described is not intended to be construed as a limitation, and any number or combination of the method operations can be combined in any order to implement a method, or an alternate method.

At 802, a carbon fiber skeleton supports a formable foam material configured as a formable aesthetic housing of a small cell installation structure for wireless technology equipment. At 804, environmental conditions are resisted by a hardened polymer coating over the formable foam material adapted to a shape of the formable aesthetic housing of the small cell installation structure. For example, the formable aesthetic housing 110 of the small cell installation structure 100 includes the structure base 118, the pole module 120, and the antenna housing module 122, all of which may be formed with the formable foam material having a hardened polymer coating, and integrated with the carbon fiber skeleton 102 for overall structural support of the small cell installation structure. The modules of the formable aesthetic housing 110 can be removable from the carbon fiber skeleton 102 and replaceable with alternate modules of the formable aesthetic housing. Further, the structure base 118 can be formed as an interchangeable component of the small cell installation structure 100 using aluminum, fiberglass, or any other type of material, such as the formable foam material with the hardened polymer coating over an internal support structure (e.g., the carbon fiber skeleton) to maintain the shape of the structure housing.

At 806, the carbon fiber skeleton is an attachable framework that facilitates equipment mounting of one or more of the wireless technology equipment. At 808, a structure base of the small cell installation structure encloses at least a portion of the wireless technology equipment. At 810, a pole module of the small cell installation structure routes cabling associated with the wireless technology equipment. At 812, wireless communication signals are passed by an antenna housing module of the small cell installation structure, where the antenna housing module is configured to enclose at least one or more antennas of the wireless technology equipment. The antenna housing module 122 can be formed from the formable foam material with a hardened polymer coating and is configured to pass millimeter wave (mmW) spectrum wireless signals. In implementations, the antenna housing module 122 can be integrated with a cable management structure, not only for the purpose of cable management, but also to provide structural integrity for the antenna housing module.

Although implementations of a small cell installation structure have been described in language specific to features and/or methods, the appended claims are not necessarily limited to the specific features or methods described. Rather, the specific features and methods are disclosed as example implementations of a small cell installation structure, and other equivalent features and methods are intended to be within the scope of the appended claims. Further, various different examples are described and it is to be appreciated that each described example of a small cell installation structure or component thereof can be implemented independently or in connection with one or more other described examples of the small cell installation structure. Additional aspects of the techniques, features, and/or methods discussed herein relate to one or more of the following:

A small cell installation structure, comprising: a carbon fiber skeleton to provide stability and an attachable framework to mount wireless technology equipment; a formable foam material configured as a formable aesthetic housing around the carbon fiber skeleton; and a hardened polymer coating over the formable foam material adapted to a shape of the formable aesthetic housing, the hardened polymer coating configured to resist environmental conditions that may otherwise hamper performance of the wireless technology equipment.

Alternatively or in addition to the above described small cell installation structure, any one or combination of: the carbon fiber skeleton is an IsoTruss structure; and the formable foam material is a polyurethane material with the hardened polymer coating. The carbon fiber skeleton is initially installable as the attachable framework, followed by the formable aesthetic housing being installable as a modular component of the small cell installation structure installed over the carbon fiber skeleton. The formable aesthetic housing is removable from the carbon fiber skeleton and replaceable with an alternate formable aesthetic housing. An antenna housing module to enclose at least one or more antennas of the wireless technology equipment. The antenna housing module is structurally integrated with the carbon fiber skeleton, the antenna housing module formed in part from the formable foam material with the hardened polymer coating and is configured to pass millimeter wave (mmW) spectrum wireless signals. The antenna housing module is structurally integrated with the carbon fiber skeleton, the antenna housing module formed in part from the formable foam material with the hardened polymer coating and is configured to pass radio frequency (RF) wireless signals up to and including 6 GHz signals. A structure base to enclose at least part of the wireless technology equipment, the carbon fiber skeleton being installable through the structure base to provide additional stability of the small cell installation structure. The formable foam material is formed to envelop and adhere to the carbon fiber skeleton.

A small cell installation structure, comprising: a formable foam material configured as a formable aesthetic housing around wireless technology equipment, the formable foam material integrated with a structural support configured to provide stability of the small cell installation structure; and a hardened polymer coating over the formable foam material adapted to a shape of the formable aesthetic housing, the polymer coating configured to resist environmental conditions that may otherwise hamper performance of the wireless technology equipment.

Alternatively or in addition to the above described small cell installation structure, any one or combination of: the formable foam material is a polyurethane material with the hardened polymer coating; and the structural support is a carbon fiber skeleton integrated with the formable foam material. An antenna housing module to enclose at least one or more antennas of the wireless technology equipment. The antenna housing module is structurally integrated with the structural support, the antenna housing module formed in part from the formable foam material with the hardened polymer coating and is configured to pass millimeter wave (mmW) spectrum wireless signals. The antenna housing module is structurally integrated with the structural support, the antenna housing module formed in part from the formable foam material with the hardened polymer coating and is configured to pass radio frequency (RF) wireless signals up to and including 6 GHz signals. A structure base to enclose at least part of the wireless technology equipment, the structure base integrated with the structural support to provide additional stability of the small cell installation structure.

A method for a small cell installation structure, comprising: supporting, by a carbon fiber skeleton, a formable foam material configured as a formable aesthetic housing of a small cell installation structure for wireless technology equipment; facilitating, as an attachable framework of the carbon fiber skeleton, equipment mounting of one or more of the wireless technology equipment; enclosing, by a structure base of the small cell installation structure, at least a portion of the wireless technology equipment; routing, by a pole module of the small cell installation structure, cabling associated with the wireless technology equipment; and passing wireless communication signals by an antenna housing module of the small cell installation structure, the antenna housing module configured to enclose at least one or more antennas of the wireless technology equipment.

Alternatively or in addition to the above described method for a small cell installation structure, any one or combination of: resisting environmental conditions by a hardened polymer coating over the formable foam material adapted to a shape of the formable aesthetic housing of the small cell installation structure. The modules of the formable aesthetic housing are removable from the carbon fiber skeleton and replaceable with alternate modules of the formable aesthetic housing. The antenna housing module is structurally integrated with the carbon fiber skeleton, the antenna housing module formed in part from the formable foam material with a hardened polymer coating and is configured to pass millimeter wave (mmW) spectrum wireless signals. The formable aesthetic housing of the small cell installation structure comprises at least the structure base, the pole module, and the antenna housing module all formed in part with the formable foam material having a hardened polymer coating and all integrated with the carbon fiber skeleton.

The invention claimed is:

1. A small cell installation structure, comprising:

a support structure of composite materials, the support structure configured to provide stability as an attachable framework to mount wireless technology equipment;

a formable aesthetic housing of the support structure integrated with a structure of a building; and a hardened polymer coating over the formable aesthetic housing adapted to a shape of the formable aesthetic housing and the structure of the building.

2. The small cell installation structure of claim 1, wherein the structure of the building is a building cornice.

3. The small cell installation structure of claim 1, wherein the structure of the building is a building column.

4. The small cell installation structure of claim 1, wherein the structure of the building is a building rooftop.

5. The small cell installation structure of claim 1, wherein the formable aesthetic housing is a polyurethane material with the hardened polymer coating configured to resist environmental conditions that may otherwise interfere with performance of the wireless technology equipment.

6. The small cell installation structure of claim 1, wherein the support structure is initially installable as the attachable framework, followed by the formable aesthetic housing being installable as a modular component of the small cell installation structure installed over the support structure and integrated with the structure of the building.

7. The small cell installation structure of claim 1, further comprising an antenna housing module to enclose at least one or more antennas of the wireless technology equipment.

8. The small cell installation structure of claim 7, wherein the antenna housing module is structurally integrated with at least one of the support structure or the structure of the building, the antenna housing module formed in part from the formable aesthetic housing with the hardened polymer coating and is configured to pass millimeter wave (mmW) spectrum wireless signals.

9. The small cell installation structure of claim 7, wherein the antenna housing module is structurally integrated with at least one of the support structure or the structure of the building, the antenna housing module formed in part from the formable aesthetic housing with the hardened polymer coating and is configured to pass radio frequency (RF) wireless signals up to and including 6 GHz signals.

10. A small cell installation structure, comprising:

a formable aesthetic housing of foam material around wireless technology equipment, the formable aesthetic housing integrated with a structure of a building configured to provide stability of the small cell installation structure; and a hardened polymer coating over the formable aesthetic housing adapted to a shape of the formable aesthetic housing and the structure of the building, the hardened polymer coating configured to resist environmental conditions that may otherwise interfere with performance of the wireless technology equipment.

11. The small cell installation structure of claim 10, further comprising a structural support formed from composite materials integrated with the formable aesthetic housing.

12. The small cell installation structure of claim 10, further comprising an antenna housing module integrated with the structure of the building to enclose at least one or more antennas of the wireless technology equipment.

13. The small cell installation structure of claim 10, wherein the structure of the building is a building cornice.

14. The small cell installation structure of claim 10, wherein the structure of the building is a building column.

15. The small cell installation structure of claim 10, wherein the structure of the building is a building rooftop.

16. A method for a small cell installation structure, the method comprising:

supporting, by a support structure integrated with a structure of a building, a formable aesthetic housing of a small cell installation structure for wireless technology equipment;

facilitating, as an attachable framework of the support structure, equipment mounting of one or more of the wireless technology equipment; and resisting environmental conditions by a hardened polymer coating over the formable aesthetic housing adapted to a shape of the formable aesthetic housing and the structure of the building.

17. The method of claim 16, wherein the structure of the building is a building cornice.

18. The method of claim 16, wherein the structure of the building is a building column.

19. The method of claim 16, wherein the structure of the building is a building rooftop.

20. The method of claim 16, further comprising a antenna housing module structurally integrated with at least one of the support structure or the structure of the building.

* * * * *